(12) United States Patent
Buendgen et al.

(10) Patent No.: US 9,298,536 B2
(45) Date of Patent: Mar. 29, 2016

(54) CREATING AN OPERATING SYSTEM DUMP

(71) Applicant: INTERNATIONAL BUSINESS MACHINES CORPORATION, Armonk, NY (US)

(72) Inventors: Reinhard Buendgen, Boeblingen (DE); Michael Holzheu, Boeblingen (DE); Jakob C. Lang, Boeblingen (DE); Angel Nunez Mencias, Boeblingen (DE); Albert Schirmer, Boeblingen (DE); Jochen Schweflinghaus, Boeblingen (DE); Martin Schwidefsky, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 14/090,071

(22) Filed: Nov. 26, 2013

(65) Prior Publication Data
US 2014/0149799 A1    May 29, 2014

(30) Foreign Application Priority Data
Nov. 28, 2012    (GB) .................................. 1221368.2

(51) Int. Cl.
G06F 11/00    (2006.01)
G06F 11/07    (2006.01)
G06F 11/14    (2006.01)

(52) U.S. Cl.
CPC ........ *G06F 11/0778* (2013.01); *G06F 11/0721* (2013.01); *G06F 11/1417* (2013.01)

(58) Field of Classification Search
CPC ............ G06F 11/0778; G06F 11/1402; G06F 11/1438; G06F 11/1666; G06F 11/2023; G06F 11/2056
USPC ............ 714/38.11, 38.1, 15, 23, 6.1, 49, 6.12
See application file for complete search history.

(56) References Cited

U.S. PATENT DOCUMENTS

| 7,290,175 B1 | 10/2007 | Kessler et al. |
| 7,437,524 B2 | 10/2008 | Narayan et al. |

(Continued)

OTHER PUBLICATIONS

Cao, Fernando Luis Vazquez, "Evaluating Linux Kernel Crash Dumping Mechanisms," Proceedings of Linux Symposium, vol. One, Jul. 2006, pp. 153-175.

(Continued)

*Primary Examiner* — Joseph D Manoskey
(74) *Attorney, Agent, or Firm* — Steven Chiu, Esq.; Rachel L. Pearlman, Esq.; Heslin Rothenberg Farley & Mesiti P.C.

(57) ABSTRACT

Creating an operating system dump. A main memory of a computer system is divided into at least three contiguous memory areas, comprising a primary memory area, a secondary memory area and a data memory area. A first instance of an OS (operating system) is booted into the main memory, a second instance of the operating system is loaded into the secondary memory area using the active first instance of the operating system, execution of the first active instance of the OS is stopped if a critical execution error occurs, and the computer system is re-started using the loaded second instance of the operating system which becomes the active instance of the OS. A dump of the primary memory area is created, and a third instance of the operating system is loaded into the primary memory area.

20 Claims, 7 Drawing Sheets

(56) References Cited

U.S. PATENT DOCUMENTS

| | | |
|---|---|---|
| 7,509,521 B2 | 3/2009 | Iwakura et al. |
| 8,453,015 B2 * | 5/2013 | Ponnuswamy ............ 714/38.11 |
| 8,762,790 B2 * | 6/2014 | McCoy ............................ 714/45 |
| 2004/0153834 A1 * | 8/2004 | Oshima et al. .................. 714/38 |
| 2005/0240806 A1 | 10/2005 | Bruckert et al. |
| 2007/0074065 A1 * | 3/2007 | Suzuki .............................. 714/5 |
| 2007/0101191 A1 | 5/2007 | Iwama |
| 2007/0220350 A1 * | 9/2007 | Ogasawara et al. ............. 714/38 |
| 2008/0133968 A1 | 6/2008 | Muppirala et al. |
| 2009/0031166 A1 | 1/2009 | Kathail et al. |
| 2010/0281297 A1 | 11/2010 | Jibbe et al. |
| 2011/0025371 A1 | 2/2011 | Simon |
| 2012/0131380 A1 * | 5/2012 | Horman et al. ................ 714/6.1 |

OTHER PUBLICATIONS

Goyal, Vivek, et al., "Kdump, A Kexec-based Kernel Crash Dumping Mechanism," Proceedings of the Linux Symposium, vol. 1, Jul. 2005, pp. 169-180.

Nellitheertha, Hariprasad, et al., "The kexec Way to Lightweight Reliable System Crash Dumping," hari.nellitheertha.com/documents/kdump.pdf, (no date information available), 14 pages.

* cited by examiner 100 method for creating operating system dump

| 102 | dividing a main memory in three contiguous areas: |

| 104 | booting a 1st instance of an operating system |

| 106 | loading a 2nd instance of the operating system into the secondary memory area |

| 108 | stopping execution of the 1st active instance of the operating system |

| 110 | re-starting the computer system using the loaded second instance of the OS |

| 112 | creating a dump of the primary memory area |

| 114 | loading a 3rd instance of the operating system in the primary memory areas |

FIG. 1

CREATING AN OPERATING SYSTEM DUMP

PRIOR FOREIGN APPLICATION

This application claims priority from United Kingdom patent application number 1221368.2, filed Nov. 28, 2012, which is hereby incorporated herein by reference in its entirety.

BACKGROUND

One or more aspects of the invention relate generally to a method for creating an operating system dump. Further, one or more aspects of the invention relate to a memory dump unit for creating an operating system dump, a computing system, a data processing program, and a computer program product.

Today's business environment requires that computing systems are constantly up and running. However, in the case of a system crash they should be up and running as fast as possible again and it should be possible to analyze the reason for the crash afterwards. Computing systems are controlled by operating systems, in particular, by their kernels. A kernel manages an operating system and related hardware resources and/or links between hardware and software components. After a crash of a system a core dump or memory dump is a usual method in order to analyze the problem that caused the system crash. A core dump should be understood as a file or data file comprising a main memory image of the operating system's status, processes, and/or values of processor registers at or short before the system crash.

For this purpose, some computer operating systems may have a kernel or memory dumper in order to generate a kernel dump. Other computer operating systems may use another processor for generating a kernel dump. A kernel dump may be a data file stored on a non-volatile storage, e.g., a hard drive.

There are several disclosures related to a method for creating an operating system dump.

Document US2009/0031166A1, which is hereby incorporated herein by reference in its entirety, discloses a method of a kernel dumper module which includes generating a dump file associated with a kernel when the kernel crashes, storing the dump file to a functional memory upon applying an overwrite protection to a core dump of the dump file, restarting the kernel through a warm reboot of the kernel such that the core dump is not erased from the functional memory, and transferring the core dump to a system file using the kernel.

Document US2005/0240806A1, which is hereby incorporated herein by reference in its entirety, discloses a plurality of redundant, loosely-coupled processor elements that are operational as a logical processor. A logic detects a halt condition of the logical processor and, in response to the halt condition, reintegrates and commences operation in less than all of the processor elements leaving at least one processor element non-operational. The logic also buffers data from the non-operational processor element in the reloaded operational processor elements and writes the buffered data to storage for analysis.

BRIEF SUMMARY

However, there may be a need to overcome time constraints related to a kernel dump and a fast recovery of the operation of the computing system. This need may be addressed by a method for creating an operating system dump, a memory dump unit for creating an operating system dump, a computing system, a data processing program, and a computer program product for creating an operating system dump.

According to one embodiment, a method for creating an operating system dump may be provided. The method may comprise dividing a main memory of a computer system into at least three contiguous memory areas, comprising a primary memory area, a secondary memory area and a data memory area, booting a first instance of an operating system into the main memory, wherein the first instance of the operating system may be the active operating system which may be restricted in its regular operation to the primary memory area and the data memory area, and loading a second instance of the operating system into the secondary memory area using the active first instance of the operating system. Furthermore, the method may comprise stopping execution of the first active instance of the operating system if a critical execution error occurs, and re-starting the computer using the loaded second instance of the operating system which may become the active instance of the operating system and which may be restricted in its regular operation to the secondary memory area and the data memory area. Additionally, the method may comprise creating a dump of the primary memory area comprising the halted first instance of the operating system, and loading a third instance of the operating system into the primary memory area.

BRIEF DESCRIPTION OF THE SEVERAL VIEWS OF THE DRAWINGS

Embodiments of the invention will now be described, by way of example only, and with reference to the following drawings:

FIG. 1 shows a block diagram of an embodiment of the method.

DETAILED DESCRIPTION

Figure 2:
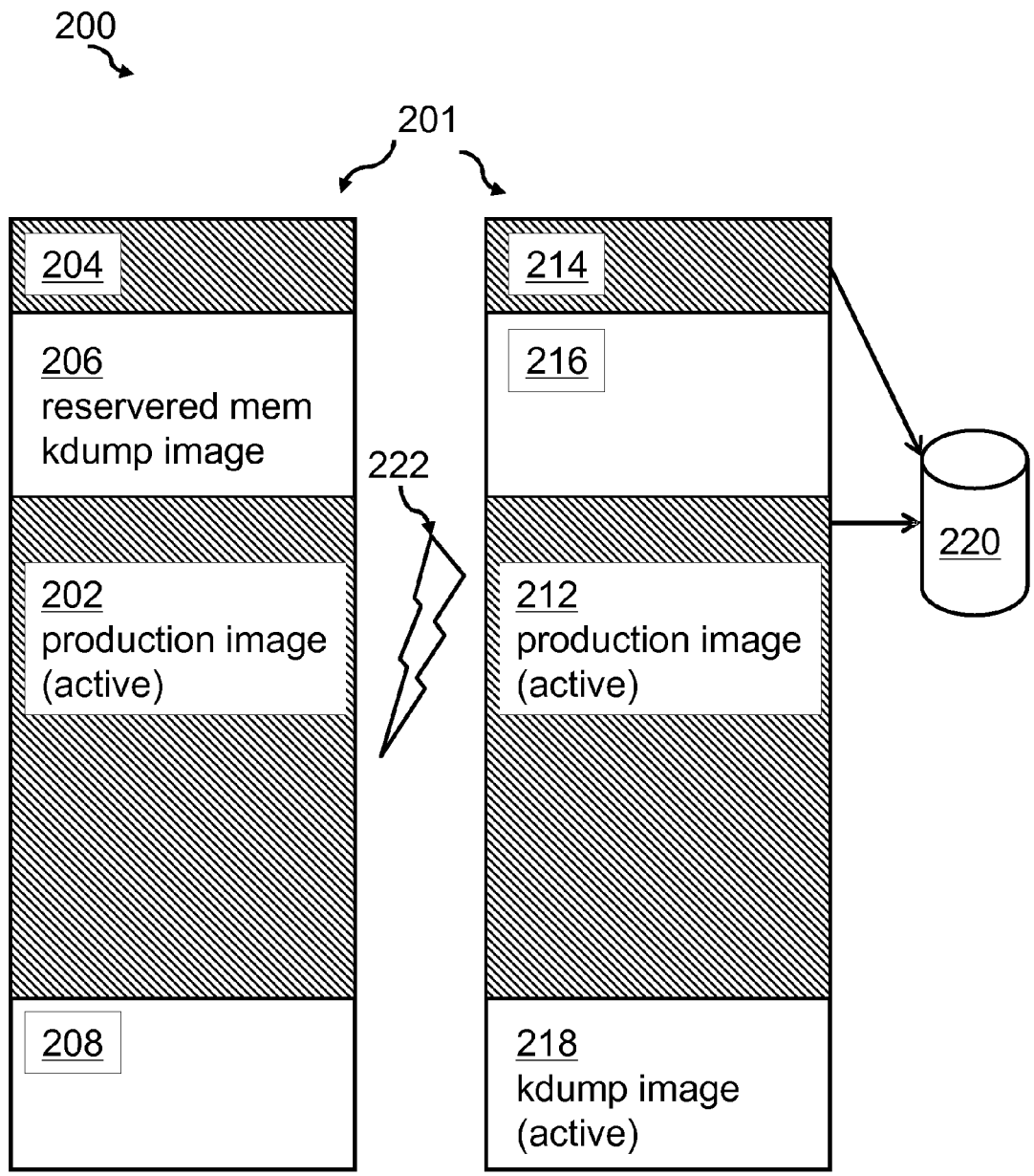
FIG. 2 shows a block diagram of an operating system and a dump function in a main memory according to the state of the art.

It may be noted that in one embodiment, the data memory area may store user data and not operating system or kernel data. In this sense the data memory area may be understood as user data space. In another embodiment, also some operating system data may be stored in the user data area.

It may also be mentioned that 'stopping execution' may not be understood as an active activity but as a "thing that happens" due to a malfunction of the system. Thus, the stopping or halting may happen automatically using standard methods of a specific operating system, external unit, firmware, BIOS, or the like. Typically, this may not reflect hardware faults of the related processor, memory, or I/O devices. Typically, a stopping may be caused by a software error like a status of panic, hang, exception, stack overflow, etc.

It may also be understood that after a system crash the secondary memory area may logically become the primary memory area. The formerly primary memory area may consequently become the secondary memory area. This way, the memory areas may logically be swapped after each system crash.

In the context of this description, the following conventions, terms and/or expressions may be used:

The term 'operating system dump' may denote a storage of a status of a kernel and potentially related software subsystems of an operating system, processor register values and status of kernel processes at or just before the time of the system crash. The operating system dump may be performed as a storing a data file to a non-volatile storage system, e.g., a hard drive for later analysis.

The term 'main memory' may denote a continuous memory area accessible by the processor of a computing system. Today, main memory cells may be operated as RAM (random memory access cells) which may be addressable by the related processor.

The term 'computer system' may denote any computer device comprising at least a processor, main memory, input/output elements and a long-term storage.

The term 'contiguous memory area' may denote continuously addressable memory cells, one after the other. However, it may not be required that the addresses of the memory cells of the contiguous memory area are equicontinuous. But in case of 'holes' on the address space, this may not have an effect of the contiguous memory area function.

The term 'primary memory area' may denote a contiguous memory area of the main memory of a computer system. It may not overlap with other memory areas of the main memory. It may be addressable by the related processor. It may not be related to a fixed address and may vary over time, e.g., be logically exchanged with a secondary memory area over time. It may also be operational in a virtualized environment.

The term 'secondary memory area' may also denote a contiguous memory area of the main memory of a computer system. It may functionally be equal if compared to the primary memory area of the main memory.

The term 'data memory area' may also denote a contiguous memory area of the main memory of a computer system. It may not overlap with the primary or secondary memory area.

The term 'booting' may denote loading an operating system into main memory of a computer or computing system and start execution of the operating system such that the operating system may control the operation of the computing system after the booting. Booting may be in contrast to the term 'loading' and/or 'activating'. A booting may require a loading of the operating system into the main memory and also an activation of the operating system so that it starts execution and controlling of the core functions of the computing system. This means that the loaded operating system may stay inactive before the activation. An activation may also be denoted as a 'warm boot' without a reload of the operating system.

The term 'regular operation' may denote an operation of an operating system without limitation, meaning that normal user operations may be handled. In particular, normal or regular operation may not limit any functions of the operating system to restricted functions, e.g., only to a dump of a kernel.

The term 'first instance', e.g., of an operating system may denote a first copy of an operating system. An original copy of the operating system may be stored, e.g., on a hard drive. If a copy of the operating system may be made and be loaded into a memory area of the main memory, then it may e.g., be a first instance of the operating system. The same may apply to a second instance of the operating system. Such a second instance may be copied or loaded to a different area of the main memory if compared to the first instance of the operating system.

The term 'stopping execution' may denote a halt of a computer system caused by a malfunction but not limited to a software error of the operating system and related services, a user program or a combination of both.

The term 'critical execution error' may denote a malfunction as explained under the paragraph 'stopping execution'. A critical execution error may result in an impossible operation code, like e.g., access to a non-existing address, a 'divide by zero', missing or insufficient amount of resources—e.g. 'out of memory', 'file not found', 'I/O error'—or other impossible operation codes.

One or more aspects of the method for creating an operating system dump may offer a couple of advantages:

By using one or more aspects of the method, it may be possible to minimize a downtime after a system crash. A dump of the memory area content related to the crashed operating system may be performed during normal operation of the restarted operating system. It may not be necessary to reboot the operating system. It may also be possible to continue operating and work with user data still accessible in the user data memory area in the main memory. The dump of the crashed operating system status may be done while the operating system is already in normal or regular working mode serving users.

Moreover, the one or more aspects may reduce downtimes of the computing systems and thus, increase productivity of related data centers. Furthermore, no special activities may have to be started after a crash—apart from the crash analysis. During a next crashed system, the roles of the first and second instance of the operating system may just be swapped again.

Enhancements may be described in a series of enhanced embodiments

According to one embodiment, the data memory area may be adapted to store only user program data. In particular, variables used by the operating system may not be stored in this area. As a result, this area may be accessed again after the crash by the newly activated operating system for the purpose of being used by a user program or application.

In an alternative embodiment, also a portion of the operating system data may be stored in the user memory area. This may give programmers more flexibility in developing user programs. After a crash, it may be useful for the new instance of the operating system to re-use also these additional data.

According to one embodiment, the second instance of the operating system may operate regularly, in particular, without functional limitations from a user perspective, while creating the dump of the primary memory area. Thus, a user or user program my restart in a short amount of time re-using another instance of the operating system resulting in minimal downtime of the computing system.

According to one further embodiment, the size of the primary memory area may be equal to the secondary memory area. In an alternative embodiment, the sizes of the primary and secondary memory area may be nearly equal in size. This may have the advantage that from a performance perspective a user or user program may not see any difference between using the primary or secondary memory area as basis for the operating system instance.

According to one embodiment, both, the first instance of the operating system and the second instance of the operating system, may comprise a dump function for creating the dump. Thus, there may be no special dump function outside the operating system required for the crashed operating system. This may have positive performance and cost aspects. By integrating the dump function into the operating system or into its kernel, it may be possible having the dump function operate like any other user program with the specialty to operate on a memory area that may not regularly be accessible by the active instance of the operating system: the memory area of the crashed operating systems instance.

A user may use the newly activated operating system while a dump of the crashed operating system instance may be made. However, it may be a prerequisite that the second operating system instance may become the first operating system instance. No stand-alone dump functions may be required any longer.

There may also be an embodiment, wherein creating the dump of the primary memory area also comprises creating a dump of the data memory area. This may allow a more thorough analysis of the root cause of the system crash.

According to an alternative embodiment, the secondary memory area may have a size for running a minimal kernel of an instance of the operating system including the dump function. In this case, the switch of the active memory areas may be used for a pure dump function only. Some other user program may also be functional. However, the purpose of such an operation mode may be to dump content of the memory area of the crashed operating system. No special core dump function outside the operating system may be required any longer.

According to an embodiment, the second instance of the operating system may have a different version than the first instance of the operating system. Such a feature may be used for upgrading an operating system to a newer version guaranteeing a minimal downtime of the operating system. User data may stay intact and the newly activated operating system and a related user program may continue to use the user data stored in the user data area. No complete re-booting of the computing system may be required. Additionally, it may not be necessary to perform a dump because no erroneous situation occurred beforehand.

According to an embodiment, the first instance of the operating system and the second instance of the operating system may be operating systems of a different type. Similar to a version change, also an elegant change of operating system types may be possible using one or more aspects, e.g., from Linux to z/OS, Windows to Linux or Android or VM or VRM or any other combination. Such a feature may result in time and cost advantages for an operation of a computing device.

According to a further embodiment, the dump function may be the kdump feature of the Linux operating system. The kdump feature may be a well known dump function. However, integrated as a regular function into the operating system, it may result in the above mentioned advantages. Other operating systems may use other dump functions. This way, it may be possible to repurpose the kernel dump function in a new way to achieve short downtimes after a system crash.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of the method for creating an operating system dump is given. Afterwards, further embodiments as well as an embodiment of the memory dump unit for creating an operating system dump will be described.

Figure 4:
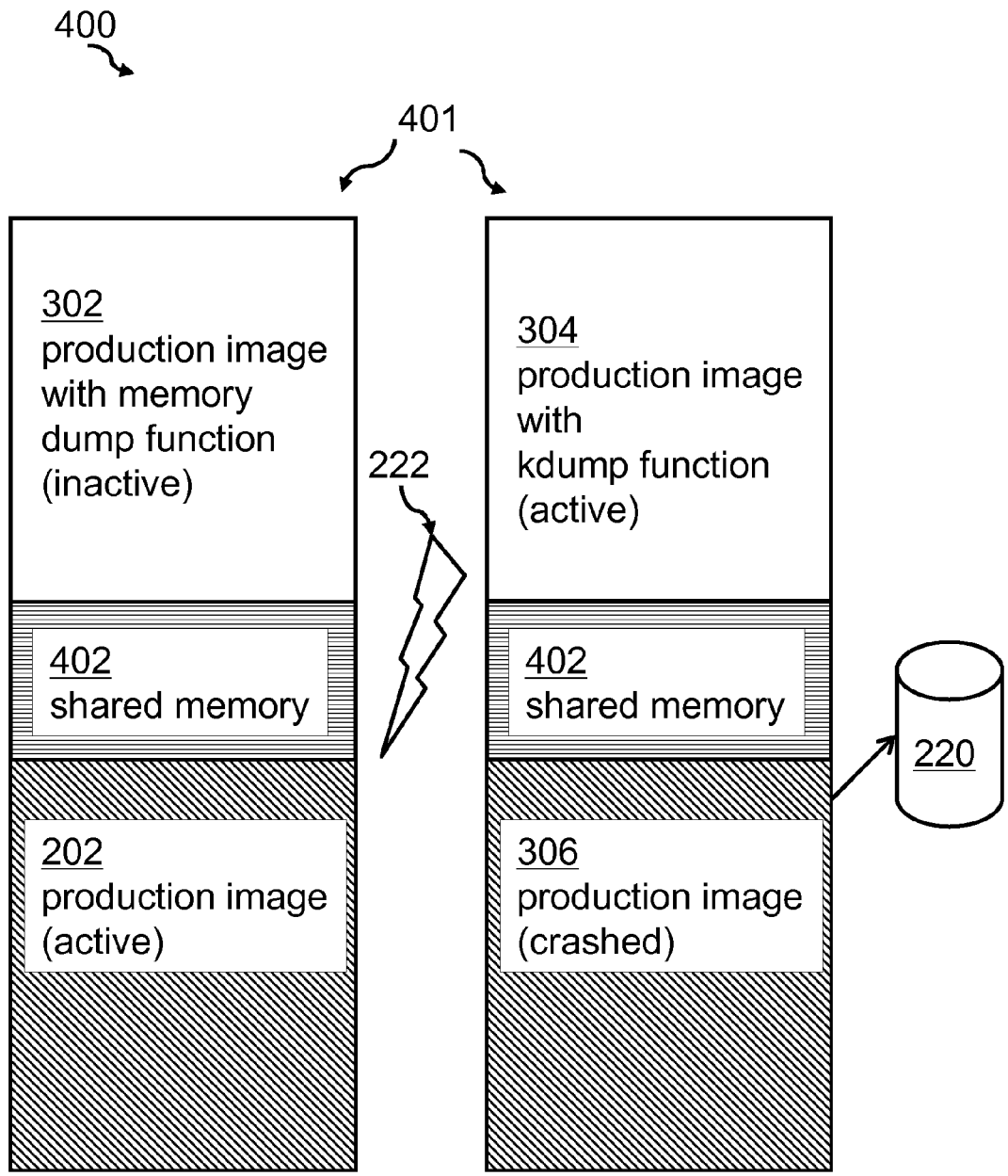
FIG. 4 shows a block diagram of a main divided memory and associated instances of the operating system according to an embodiment.

FIG. 1 shows a block diagram 100 of an embodiment of the method. The method may comprise dividing, 102, a main memory of a computer system into at least three contiguous areas comprising a primary memory area, a secondary memory area and a data memory area. As shown in FIG. 4, the data memory area may be positioned in-between the primary and secondary memory area. However, permutations of the areas are possible. It may be noted that the areas may not be overlapping.

Furthermore, the method may comprise booting, 104, in particular loading and activating or starting execution of a first instance of an operating system into the main memory, wherein the first instance of the operating system may be the active operating system which may be restricted in its regular operation to the primary memory area and the data memory area. However, the user data area may only be used for user data. In one embodiment, operating system data and variables may not be stored in the data memory area. Operating system data and variables may also be stored in the related primary or secondary memory area. In an alternative embodiment also operating system data may be stored in the user data memory area.

Additionally, the method may comprise loading, 106, in particular not activating, a second instance or second copy of the operating system into the secondary memory area. The active first instance of the operating system may be instrumental for achieving this. It may be in contrast to a system according to a known technique in which the booting may be performed after a crash of the operating system into the same memory area used by the operating system before the crash. Another feature of the method—after stopping execution, 108, of the first active instance of the operating system if a critical execution error may have occurred—may be a re-starting, 110, of the computer may be performed using the loaded second instance of the operating system which may now become the active instance of the operating system. It may be restricted in its regular operation to the secondary memory area and the data memory area. This may logically make the second instance of the operating system in the secondary memory area the first active instance without any additional copy and/or load and/or boot process.

Last but not least, the method may comprise creating, 112, a dump of the primary memory area comprising the halted first instance of the operating system, while continuing its regular operation, and loading, 114, in particular not activating, a third instance of the operating system into the primary memory area after the dump has been taken. This may make the newly loaded instance of the operating system the new inactive second instance of the operating system, after the second instance of the operating system may have become the logical first operating system instance.

Thus, the secondary instance continues regular operation of the primary instance, while dumping the crashed primary instance.

FIG. 2 shows a block diagram 200 of an operating system or production image being booted and operational according to the state of the art. The operating system may be loaded into the memory area related to the production image 202, 204 before a system crash 222. There may be a reserved area 208 of the main memory 201 not usable by the operating system. Moreover, in the area 206 related to the kdump image of the main memory 201, a copy of a dump function—here a kdump image of the Linux operating system—may be stored. In case of a crash 222, the content of the kdump image area 206 may be copied into the memory area 218 and may start execution of an operating system dump of the areas 202, 204 of the formerly productive image of the operating system. After that, a new instance of the operating system or production image may be loaded into the related memory area 212 and 214. A new image of the kdump function may also be loaded into the memory area 216. The dump may generate an image of the crashed production image to an external non-volatile storage system 220. It may be noted that according to known technologies after a system crash and in contrast to the newly proposed solution, a complete reboot may be required.

Figure 3:
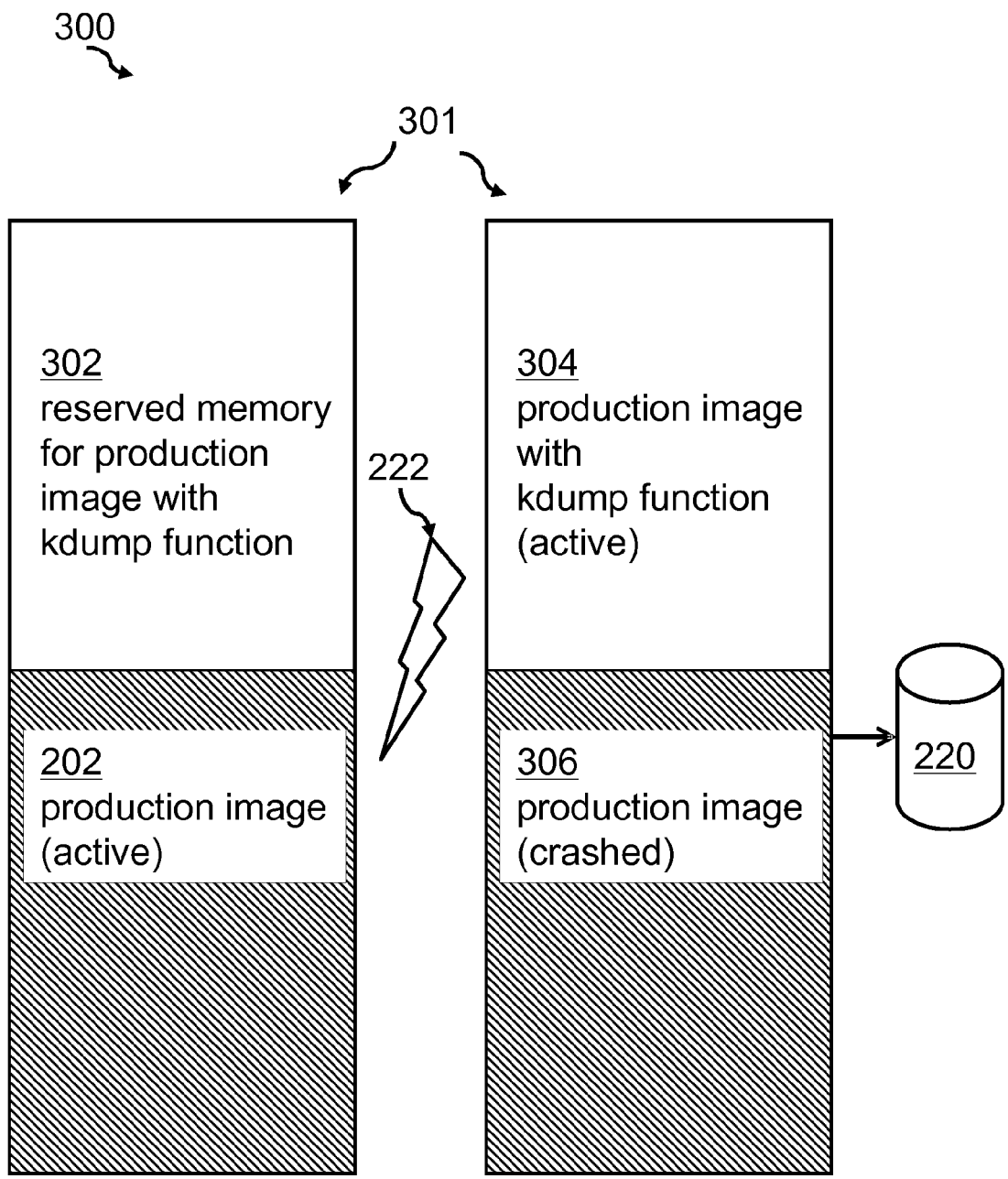
FIG. 3 shows a block diagram of a main memory divided into two memory areas before and after an operating system crash according to known technologies.

FIG. 3 shows a block diagram 300 of a main memory 301 divided into two memory areas before and after an operating system crash 222 according to the state of the art. A production image 202 may run in a related area of the main memory 301. Memory area 302 may be reserved for a second instance of a production image with a dump feature. After a system crash 222, a new production image may be booted and activated in memory areas 304 to dump the crashed production image 306—formerly the active production image 202. Here as before, the dump may be stored on a disk system 220. However, the necessary booting and activation may require a relatively large amount of time, and all user data may be lost during the system crash and/or the re-booting.

FIG. 4 shows a block diagram 400 of an embodiment of a main memory 401 split according to one or more aspects of the invention. As can be seen, the main memory 401 may be split into three distinct memory areas 202, 302, 402. Secondary memory area 302 may be reserved for an inactive production image with a kdump function. A shared memory area 402 may be a data memory area accessible by both production images, the active and the inactive at a later point in time. Memory area 202 may comprise the active production image including related operating system data and variables. However, also in the shared memory area, the user data area, operating system data and/or variables may be stored.

After a system crash 222, the active production image in area 202 may not be functional any longer. In that case, the production image in memory area 304—formerly area 302— may be activated and continue operation of the computing system on behalf of the crashed operating system (area 306). Because the production image related to memory area 304 after the system crash 222 may also access the data in the data memory area 402, a continuation of user programs may be possible with only a little delay.

It may be noted that the data in memory area 402 may stay intact during and after the crash. The dump to an external storage 220 may be performed under control of the now active instance of the operating system being executed in the secondary memory area 304. After the dump a new instance, a third instance of the operating system image may be stored into the memory area 306 of the previously crashed operating system. This way, the roles of the primary and secondary memory areas have been exchanged. After the system crash 222, the memory area 304 is the primary memory area and the memory area 306 may become the secondary memory area. The data memory area 402 may not be affected.

Figure 5A:
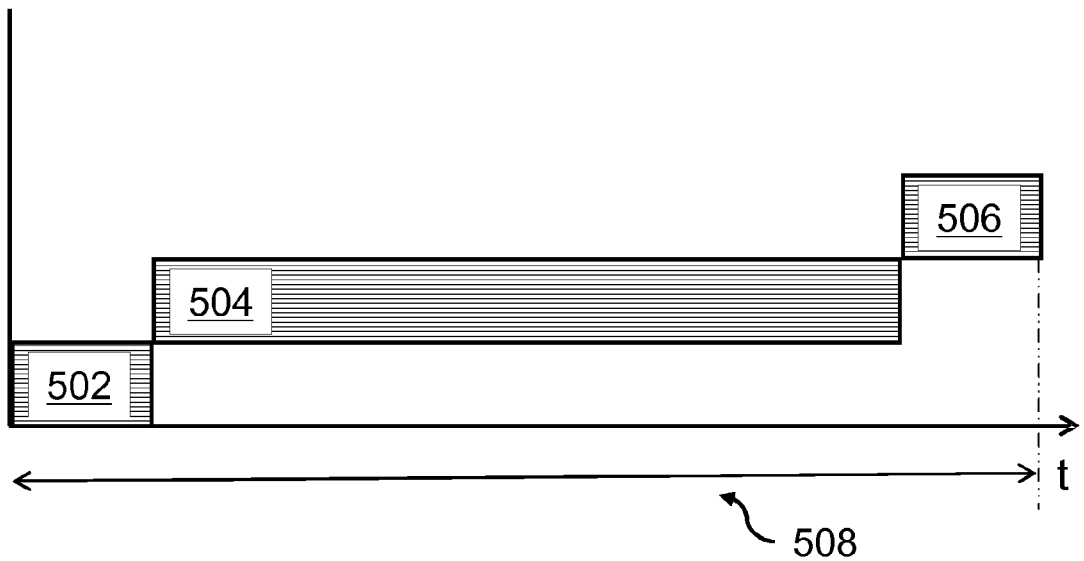
FIG. 5a shows a timing diagram for a rebooting of a conventional system.

FIG. 5a shows a timing diagram for a rebooting of a conventional system after a system crash. Time block 502 may symbolize the time consumed by the crash of the system. Time block 504 may symbolize the time required for a dump of the crashed operating system. This may include the time required to load and activate a dump function, e.g., the kdump feature of the Linux operating system. Time block 506 may represent a rebooting time of a new instance of the operating system. In total, downtime 508 may be required before a new instance may be booted and be operational to react to user programs.

Figure 5B:
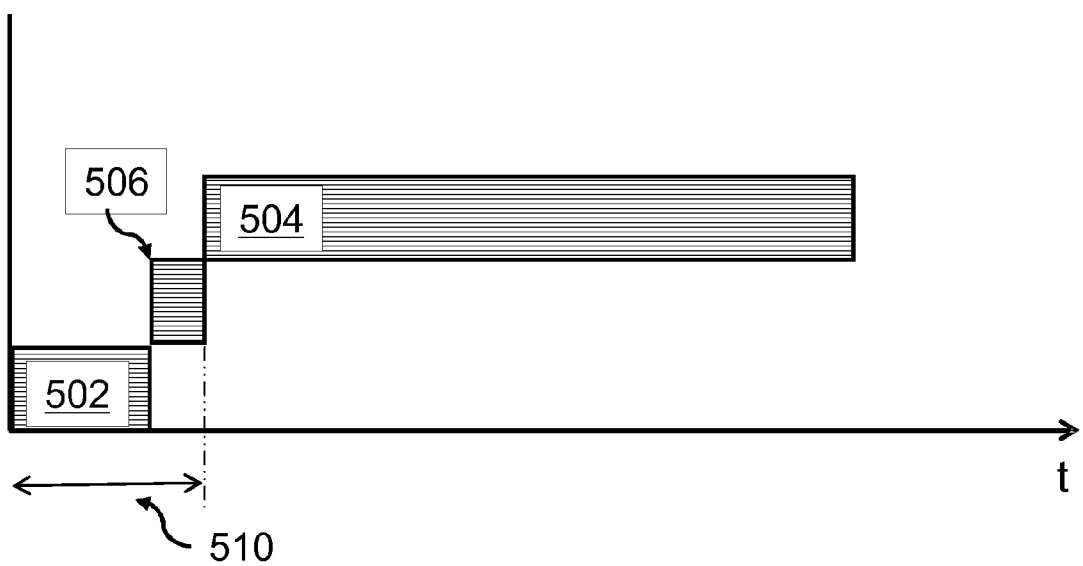
FIG. 5b shows a timing diagram of a operating system dump according to an embodiment.

In FIG. 5b, in contrast to FIG. 5a, and according to one or more aspects, the downtime 510 is much shorter because no rebooting of a new instance of the operating system may be required—it has already been loaded. Therefore, time block 506 is shown much smaller if compared to FIG. 5a. Additionally, also the time 504 required for a dump of the crashed operating system is smaller because no dump feature needs to be loaded or copied. According to one or more aspects, it is already part of the already loaded newly activated instance of the operating system with no need for a loading. As a consequence, a user program may become active after the much shorter downtime 510 if compared to downtime 508 of FIG. 5a. Thus, a user may access normal operating system functions, while the operating system may dump the crashed primary instance of the operating system in parallel.

Figure 6:
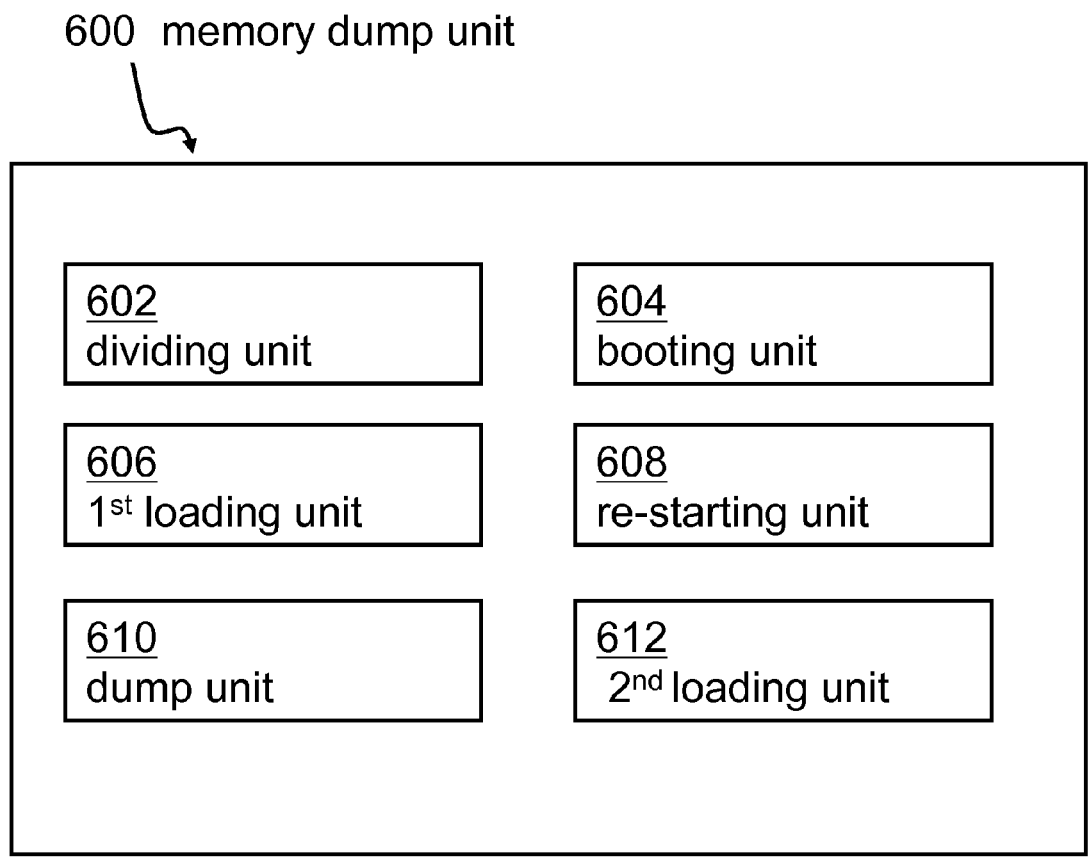
FIG. 6 shows an embodiment of a memory dump unit.

FIG. 6 shows an embodiment of the memory dump unit 600. The memory dump unit 600 for creating an operating system dump may comprise a dividing unit 602 adapted for dividing a main memory of a computer system into at least three contiguous memory areas, comprising a primary memory area, a secondary memory area and a data memory area.

A booting unit 604 may be adapted for booting a first instance of an operating system in the main memory, wherein the first instance of the operating system may be the active operating system which may be restricted in its—e.g., regular—operation to the primary memory area and the data memory area. A first loading module 606 of the memory dump unit 600 may be adapted for loading a second instance of the operating system in the memory using the active first instance of the operating system. In case of a stopped execution of the first active instance of the operating system if a critical execution error occurs, a re-starting unit 608 may become active. It may be adapted for restarting the computer system using the loaded, second instance of the operating system which becomes the active instance of the operating system and which may be restricted in its regular operation to the secondary memory area and the data memory area. A dump module 610 may be adapted for creating a dump of the primary memory area comprising the halted first instance of the operating system. A second loading unit 612 may be adapted for loading a third instance of the operating system into the primary memory area. It may be noted that the first and the second loading unit may be identical and operational to perform both load processes using different parameters.

Figure 7:
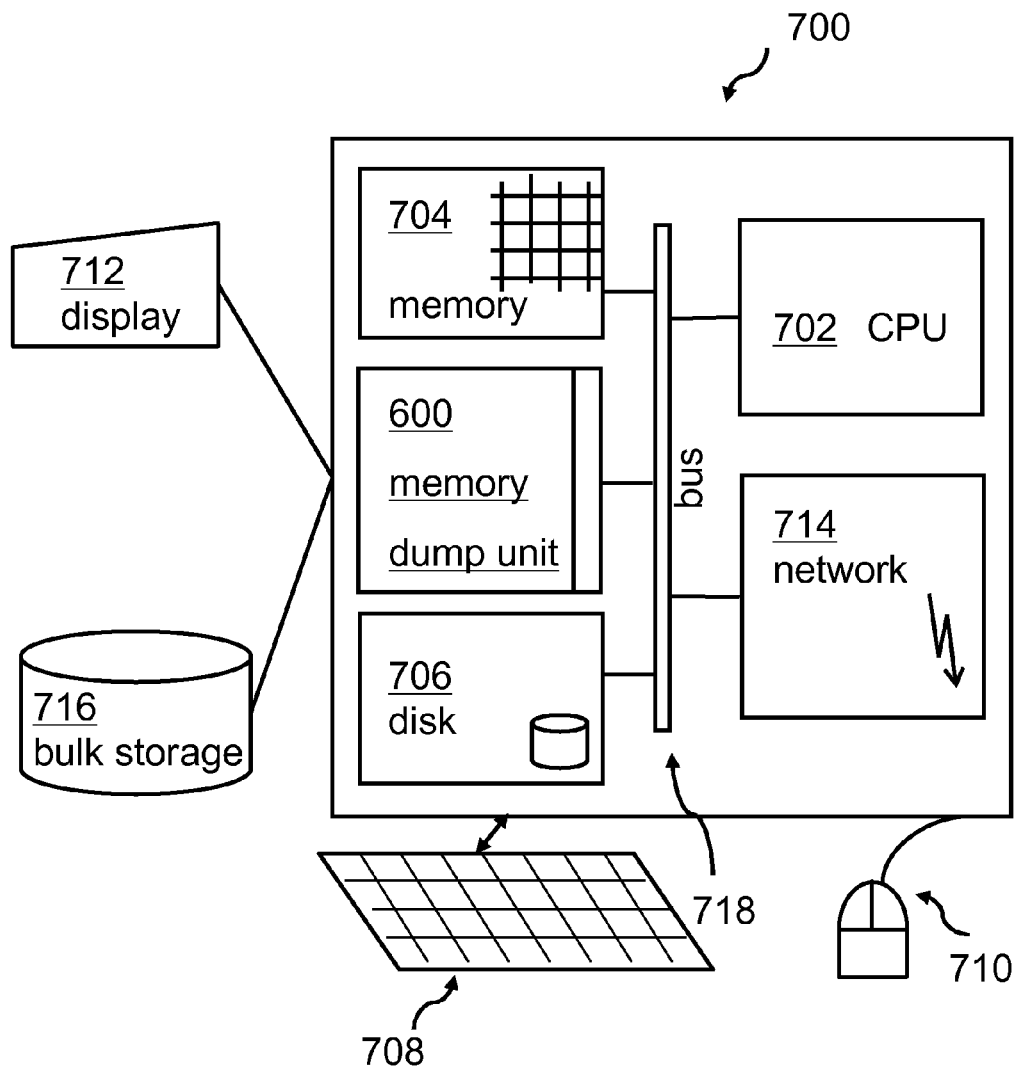
FIG. 7 shows a block diagram of a computer system comprising the memory dump unit.

Embodiments of the invention may be implemented together with virtually any type of computer, regardless of the platform being suitable for storing and/or executing program code. For example, as shown in FIG. 7, a computing system 700 may include one or more processor(s) 702 with one or more cores per processor, associated memory elements 704, an internal storage device 706 (e.g., a hard disk, an optical drive such as a compact disk drive or digital video disk (DVD) drive, a flash memory stick, a solid-state disk, etc.), and numerous other elements and functionalities, typical of today's computers (not shown). The memory elements 704 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 716 for an execution. Elements inside the computer 700 may be linked together by means of a bus system 718 with corresponding adapters. Additionally, a memory dump unit 600 for creating an operating system dump may be attached to the bus system 718.

The computing system 700 may also include input means, such as a keyboard 708, a pointing device such as a mouse 710, or a microphone (not shown). Alternatively, the computing system may be equipped with a touch sensitive screen as main input device. Furthermore, the computer 700, may include output means, such as a monitor or screen 712 [e.g., a liquid crystal display (LCD), a plasma display, a light emitting diode display (LED), or cathode ray tube (CRT) monitor]. The computer system 700 may be connected to a network (e.g., a local area network (LAN), a wide area network (WAN), such as the Internet or any other similar type of network, including wireless networks via a network interface connection 714. This may allow a coupling to other computer systems or a storage network or a tape drive. Those, skilled in the art will appreciate that many different types of computer systems exist, and the aforementioned input and output means may take other forms. Generally speaking, the computer system 700 may include at least the minimal processing, input and/or output means, necessary to practice embodiments of the invention.

As described herein, according to one embodiment, a method for creating an operating system dump may be provided. The method may comprise dividing a main memory of a computer system into at least three contiguous memory areas, comprising a primary memory area, a secondary memory area and a data memory area, booting a first instance of an operating system into the main memory, wherein the first instance of the operating system may be the active operating system which may be restricted in its regular operation to the primary memory area and the data memory area, and loading a second instance of the operating system into the secondary memory area using the active first instance of the operating system. Furthermore, the method may comprise stopping execution of the first active instance of the operating system if a critical execution error occurs, and re-starting the computer using the loaded second instance of the operating system which may become the active instance of the operating system and which may be restricted in its regular operation to the secondary memory area and the data memory area. Additionally, the method may comprise creating a dump of the primary memory area comprising the halted first instance of the operating system, and loading a third instance of the operating system into the primary memory area.

According to another embodiment, a memory dump unit for creating an operating system dump may be provided. The memory dump unit may comprise a dividing unit adapted for dividing a main memory of a computer system into at least three contiguous memory areas, comprising a primary memory area, a secondary memory and a data memory area; a booting unit adapted for booting a first instance of an operating system into the main memory, wherein the first instance of the operating system may be the active operating system which may be restricted in its—e.g., regular—operation to the primary memory area and the data memory area. Additionally, the memory dump unit may comprise a first loading module adapted for loading a second instance of the operating system in the memory using the active first instance of the operating system; and a re-starting unit which become active after stopping execution of the first active instance of the operating system if a critical execution error occurs. The re-starting unit may be adapted for re-starting the computer system using the loaded, second instance of the operating system which may become the active instance of the operating system and which may be restricted in its regular operation to the secondary memory area and the data memory area. Furthermore there may be a dump module adapted for creating a dump of the primary memory area comprising the halted first instance of the operating system; and a second loading unit adapted for loading a third instance of the operating system into the primary memory area.

It may be noted that there may be made a difference between 'loading', meaning storing in the main memory but not activating or starting, and 'booting', meaning loading into main memory and starting to execute. A loaded operating system may be activated, meaning, starting to execute at a later point in time.

Thus, the secondary instance continues regular operation of the primary instance, while dumping the crashed primary instance.

Attention may be given to the fact that the third instance of the operating system may, in particular, become the new second instance of the operating system, while the original second instance of the operating system came into the role of the first instance of the operating system.

While one or more aspects of the invention have been described with respect to a limited number of embodiments, those skilled in the art, having benefit of this disclosure, will appreciate that other embodiments may be devised, which do not depart from the scope of the invention, as disclosed herein. Accordingly, the scope of one or more aspects of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of aspects of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

What is claimed is:

1. A method for creating an operating system dump, the method comprising:
dividing a main memory of a computer system into at least three contiguous memory areas, comprising a primary memory area, a secondary memory area and a data memory area;
booting a first instance of an operating system into the main memory, wherein the first instance of the operating system is the active operating system which is restricted in its regular operation to the primary memory area and the data memory area;
loading a second instance of the operating system into the secondary memory area using the active first instance of the operating system;
stopping execution of the active first instance of the operating system based on occurrence of a critical execution error, and re-starting the computer system using the loaded second instance of the operating system which becomes the active instance of the operating system and which is restricted in its regular operation to the secondary memory area and the data memory area;
creating a dump of the primary memory area comprising the halted first instance of the operating system; and
loading a third instance of the operating system into the primary memory area.

2. The method according to claim 1, wherein the data memory area is adapted to store user program data.

3. The method according to claim 2, wherein the data memory area is further adapted to store at least one of a portion of operating system data and values.

4. The method according to claim 1, wherein the second instance of the operating system continues operating regularly while creating the dump of the primary memory area.

5. The method according to claim 1, wherein a size of the primary memory area is equal to the secondary memory area.

6. The method according to claim 1, wherein creating the dump of the primary memory area further comprises creating a dump of the data memory area.

7. The method according to claim 1, wherein both, the first instance of the operating system and the second instance of the operating system, comprise a dump function for creating the dump.

8. The method according to claim 1, wherein the secondary memory area has a size for running a minimal kernel of an instance of the operating system including the dump function.

9. The method according to claim 1, wherein the second instance of the operating system has a different version than the first instance of the operating system.

10. The method according to claim 1, wherein the first instance of the operating system or the second instance of the operating system are different operating systems.

11. The method according to claim 1, wherein the dump function is the kdump feature of the Linux operating system.

12. A computer program product for creating an operating system dump, the computer program product comprising:
a computer readable storage medium readable by a processing circuit and storing instructions for execution by the processing circuit for performing a method comprising:
dividing a main memory of a computer system into at least three contiguous memory areas, comprising a primary memory area, a secondary memory area and a data memory area;
booting a first instance of an operating system into the main memory, wherein the first instance of the operating system is the active operating system which is restricted in its regular operation to the primary memory area and the data memory area;
loading a second instance of the operating system into the secondary memory area using the active first instance of the operating system;
stopping execution of the active first instance of the operating system based on occurrence of a critical execution error, and re-starting the computer system using the loaded second instance of the operating system which becomes the active instance of the operating system and which is restricted in its regular operation to the secondary memory area and the data memory area;
creating a dump of the primary memory area comprising the halted first instance of the operating system; and
loading a third instance of the operating system into the primary memory area.

13. The computer program product according to claim 12, wherein the data memory area is adapted to store user program data.

14. The computer program product according to claim 12, wherein the second instance of the operating system operates regularly while creating the dump of the primary memory area.

15. The computer program product according to claim 12, wherein a size of the primary memory area is equal to the secondary memory area.

16. The computer program product according to claim 12, wherein both, the first instance of the operating system and the second instance of the operating system, comprise a dump function for creating the dump.

17. The computer program product according to claim 12, wherein the secondary memory area has a size for running a minimal kernel of an instance of the operating system including the dump function.

18. A computer system for creating an operating system dump, the computer system comprising:
a memory; and
a processor in communications with the memory, wherein the computer system is configured to perform a method, said method comprising:
dividing a main memory of a computer system into at least three contiguous memory areas, comprising a primary memory area, a secondary memory area and a data memory area;
booting a first instance of an operating system into the main memory, wherein the first instance of the operating system is the active operating system which is restricted in its regular operation to the primary memory area and the data memory area;
loading a second instance of the operating system into the secondary memory area using the active first instance of the operating system;
stopping execution of the active first instance of the operating system based on occurrence of a critical execution error, and re-starting the computer system using the loaded second instance of the operating system which becomes the active instance of the operating system and which is restricted in its regular operation to the secondary memory area and the data memory area;
creating a dump of the primary memory area comprising the halted first instance of the operating system; and
loading a third instance of the operating system into the primary memory area.

19. The computer system according to claim 18, wherein the data memory area is adapted to store user program data.

20. The computer system according to claim 18, wherein the secondary memory area has a size for running a minimal kernel of an instance of the operating system including the dump function.

\* \* \* \* \*